United States Patent [19]
Carrie

[11] Patent Number: 5,053,941
[45] Date of Patent: Oct. 1, 1991

[54] ASYNCHRONOUS MICRO-MACHINE/INTERFACE

[75] Inventor: Susan E. Carrie, Sunnyvale, Calif.

[73] Assignee: Sun Microsystems, Inc., Mountain View, Calif.

[21] Appl. No.: 464,713

[22] Filed: Jan. 12, 1990

Related U.S. Application Data

[63] Continuation of Ser. No. 901,929, Aug. 29, 1986, abandoned.

[51] Int. Cl.$^5$ .............................................. G06F 13/12
[52] U.S. Cl. ................................. 364/200; 364/228.5; 364/239.1; 364/260.1; 364/263.1; 364/270.5; 364/270.7
[58] Field of Search ... 364/200 MS File, 900 MS File

[56] References Cited

U.S. PATENT DOCUMENTS

| | | | |
|---|---|---|---|
| 4,075,688 | 2/1978 | Lynch, Jr. et al. | 364/200 |
| 4,104,720 | 8/1978 | Gruner | 364/200 |
| 4,312,034 | 1/1982 | Gunter et al. | 364/200 |
| 4,330,824 | 5/1982 | Girard | 364/200 |
| 4,366,540 | 12/1982 | Berglund et al. | 364/200 |
| 4,415,969 | 11/1983 | Bayliss et al. | 364/200 |
| 4,438,492 | 3/1984 | Harmon, Jr. et al. | 364/200 |
| 4,445,197 | 4/1984 | Lorie et al. | 364/200 |
| 4,509,116 | 4/1985 | Lackey et al. | 364/200 |
| 4,613,935 | 9/1986 | Couleur | 364/200 |
| 4,639,886 | 1/1987 | Hashimoto et al. | 364/200 |
| 4,752,873 | 6/1988 | Shonai et al. | 364/200 |
| 4,791,551 | 12/1988 | Garde | 364/200 |

FOREIGN PATENT DOCUMENTS

| | | |
|---|---|---|
| 1134952 | 1/1980 | Canada . |
| 013291A3 | 9/1979 | European Pat. Off. . |
| 098494A2 | 6/1983 | European Pat. Off. . |
| WO86/047-00A1 | 2/1986 | PCT Int'l Appl. . |
| 2050016A | 10/1978 | United Kingdom . |
| 2115964A | 2/1983 | United Kingdom . |

OTHER PUBLICATIONS

Veneski et al., "Asynchronous Pipelined Instruction Prefetch Mechanism", IBM Tech. Disc. Bull., vol. 25, No. 9, Feb./83, pp. 4722-4727.

Primary Examiner—Gareth D. Shaw
Assistant Examiner—Brian L. Klock
Attorney, Agent, or Firm—Blakely Sokoloff Taylor & Zafman

[57] ABSTRACT

An asynchronous micro-machine/interface responsive to a central processing unit (CPU) in which the CPU and the micro-machine/interface are run on clocks which are asynchronous from one another is provided. The inventive asynchronous micro-machine/interface has data path elements for receiving an incoming instruction and for performing actions requested by the incoming instruction, as well as a means for synchronizing the incoming instruction to the clock of the micro-machine/interface and for performing actions within the data path elements prior to the execution of the incoming instruction and during transfer of control, by the micro-machine/interface, to the routine that is associated with the incoming instruction.

5 Claims, 6 Drawing Sheets

ASYNCHRONOUS MICRO-MACHINE/INTERFACE

RELATED APPLICATIONS

This is a continuation of application Ser. No. 06/901,929 filed Aug. 29, 1986 now abandoned.

FIELD OF THE INVENTION

The present invention relates to microcoded machines ("micro-machines"), and more particularly to micro-machines which run asynchronous from the system in which they are interfaced.

BACKGROUND OF THE INVENTION

In prior art computer systems employing micro-machines which are clocked asynchronously from the system with which they are interfaced (i.e. wherein the clock of the micro-machine is out of phase or has a different period than the clock running the system with which the micro-machine is interfaced), latency (the time lag between the time of issuance of an incoming instruction to the micro-machine and the time of instruction completion) is a critical and troublesome problem. For purposes of the Specification herein, the term "micro-machine" or asynchronous micro-machine is defined as a computational computer system which includes a command or instruction register which is typically updated at every clock cycle with commands that are read from a microstore memory and which are used to execute an incoming instruction. These commands typically are comprised of control signals as well as data.

In order to overcome the problem of latency which occurs in micro-machines that run asynchronously from the CPU from which the micro-machine receives its instructions, prior art systems employ various synchronization interfacing circuitry between the master CPU and the asynchronous micro-machine. Such prior art synchronization interfaces generally hold the incoming instruction issued by the CPU, synchronize the instruction to the clock of the micro-machine and, at the completion of the synchronization process, set a flag bit which informs the micro-machine that an instruction is waiting. The micro-machine then, in turn, transfers control (changes addresses) to the routine that corresponds to the incoming, now synchronized, instruction. The two primary examples of such prior art synchronization interfaces are "FIFO" and shared memory systems.

However, with all such prior art synchronization systems, synchronization of the incoming instruction and transfer of control by the micro-machine to the routine of the instruction occurs substantially consecutively, such that the length of time it takes to synchronize the incoming instruction and the length of time it takes the micro-machine to transfer control to the routine that corresponds to the instruction are cumulative. Further, no actions are taken for that instruction until transfer of control by the micro-machine takes place. Therefore, latency is merely reduced and is not minimized. Accordingly, in all prior art systems employing asynchronous micro-coded machines, latency remains a critical and unsolved problem.

SUMMARY OF THE INVENTION

The obstacles and drawbacks contained in the prior art are overcome in an asynchronous micro-machine/interface responsive to a central processing unit (CPU), the CPU and the micro-machine/interface being run on clocks which are asynchronous from one another, the asynchronous micro-machine/interface having data path elements for receiving an incoming instruction and for performing actions requested by said incoming instruction, as well as an instruction execution means for executing the instruction and a means for synchronizing the incoming instruction to the clock of the micro-machine/interface and for performing actions within the data path elements prior to execution of the incoming instruction and during transfer of control, by the micro-machine/interface, to the routine that is associated with the incoming instruction.

A second embodiment of the micro-machine/interface of the present invention is also provided wherein the incoming instruction is transmitted by the CPU in two accesses, and wherein the synchronization means synchronizes the first access of the incoming instruction and the second access of the incoming instruction such that, the instruction execution means executes the first access of the incoming instruction while the second access is being synchronized such that at least one clock cycle after completion of the execution of the first access of the incoming instruction the instruction execution means begins execution of the second access.

A third embodiment of the micro-machine/interface of the present invention is also provided which further comprises the next instruction latches means for capturing a next incoming instruction while the micro-machine/interface is executing the incoming instruction. The next instruction means comprises a plurality of latches coupled between the CPU and the micro-machine/interface, the plurality of latches also being coupled to the synchronization means and being controlled by the same such that, when the micro-machine/interface is executing the previously incoming instruction and the CPU transmits the next instruction, the synchronization means deasserts the enables of the plurality of latches, thereby closing the next instruction latch means and capturing the next instruction.

DETAILED DESCRIPTION OF THE PREFERRED EMBODIMENTS

In the following description for purposes of explanation, bits, logic blocks, timing relationship, etc. are set forth in order to provide a thorough understanding of the present invention. However, it will be apparent to one skilled in the art that the present invention may be practiced without these specific details. In other instances, well known circuits and devices are shown in block diagram form in order not to obscure the present invention in unnecessary detail.

Figure 1:
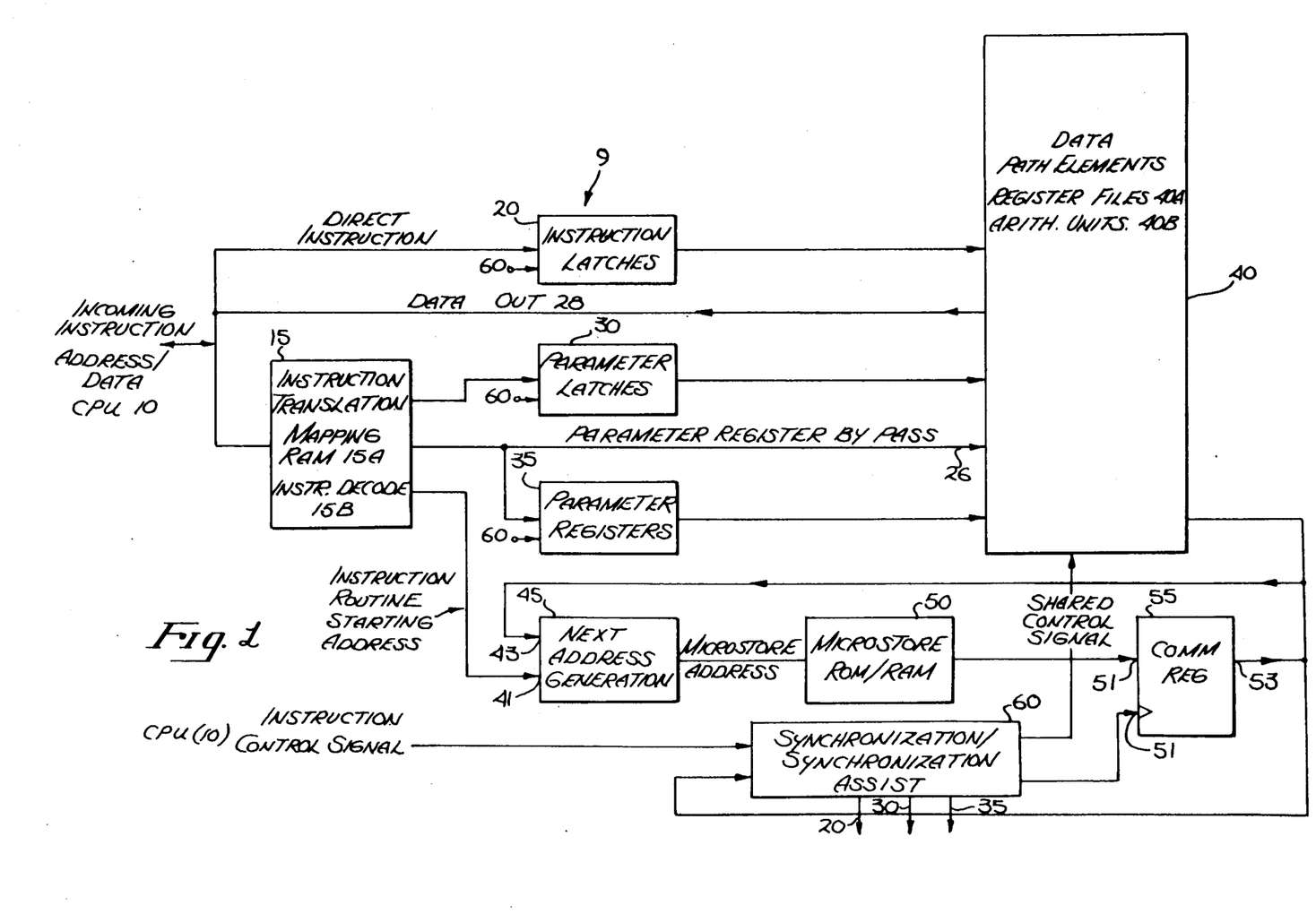
FIG. 1 shows a block diagram view of the first embodiment of the invented micro-machine/interface of the present invention.

In FIG. 1 there is shown a general block diagram of the first embodiment of the invented micro-machine/interface denoted generally by reference numeral 9.

Figure 2:
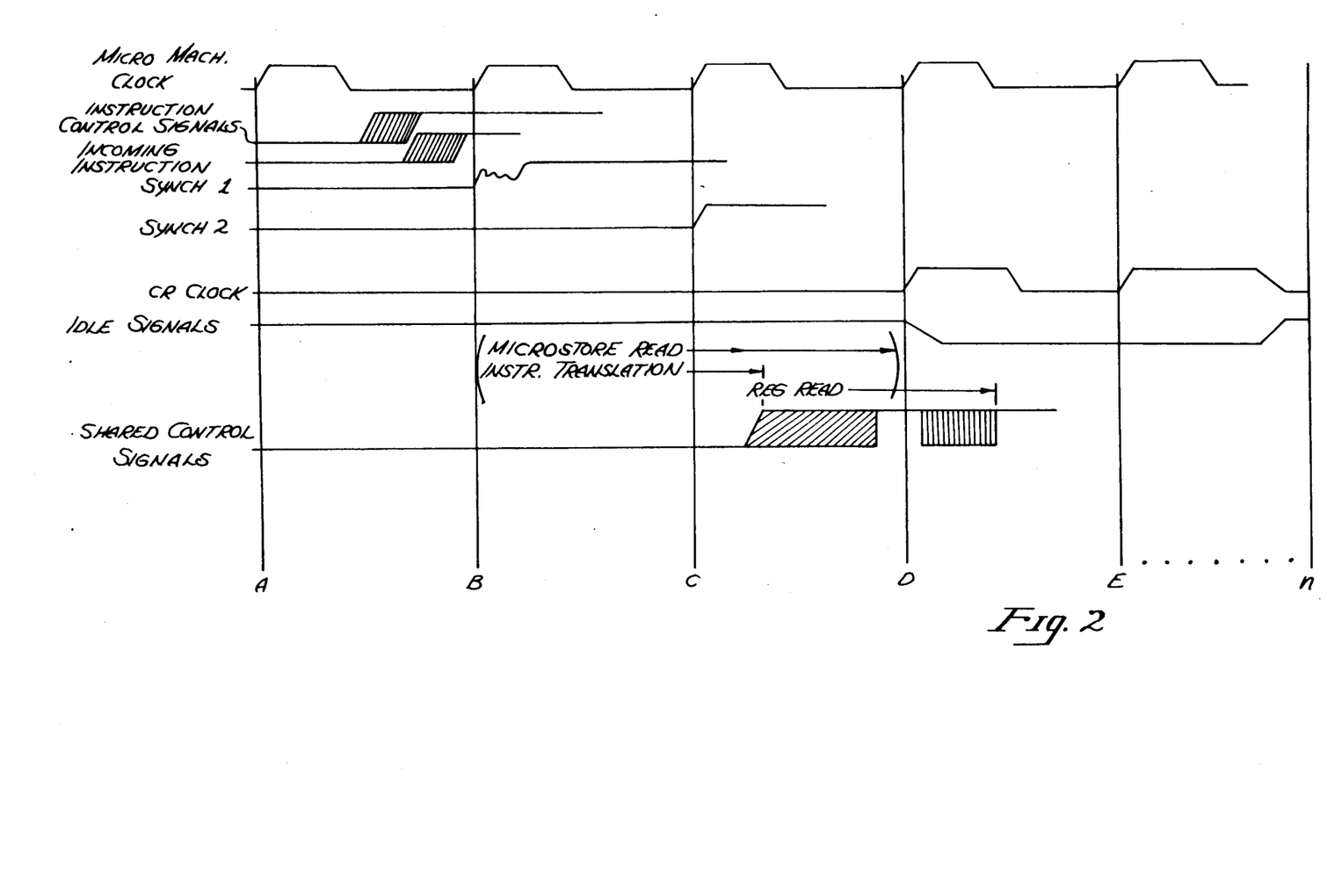
FIG. 2 shows a timing diagram illustrating certain signals which are transmitted or asserted during a typical operation of the micro-machine/interface of FIG. 1.

In FIG. 2 there is shown a timing diagram illustrating certain signals which are transmitted or asserted during the operation of the micro-machine/interface of FIG. 1. Operation of the micro machine interface of FIG. 1 will be described in conjunction with reference to FIG. 2, however, FIG. 2 represents only an illustrative timing diagram of the execution of a particular instruction under the condition in which the micro-machine/interface 9 is not executing a previous instruction when the incoming instruction arrives. Operation of the micro-machine/interface 9 will later be described in a situation wherein a previous instruction is being executed when the incoming instruction arrives.

In the example instruction employed to illustrate the operation of the first embodiment of the micro-machine/interface 9 of FIG. 1, the incoming instruction is asserted by the CPU 10 sometime during clock cycle A-B of FIG. 2. The particular incoming instruction used as an example herein requests the addition of the operand contained in the incoming instruction and the contents of register 1 of the register files 40A of data path elements 40. The incoming instruction in the example instruction herein described contains an operand, an op code, and a user register address. It will be appreciated however that the micro-machine/interface 9 is capable of performing many other types of instructions (e.g. vector addition, subtraction, etc.) and is not restricted to executing only the exemplary addition instruction, the particular instruction described herein being merely for purposes of illustration and clarity with respect to operation of the micro-machine/interface 9.

A command register 55 enters an "idle state" upon the completion of every instruction. For purposes of the Specification herein, "idle state" is defined as the period of time during which the command register 55 is not executing the routine of an incoming instruction (i.e. the period of time during which the command register 55 is frozen and is not clocking through the commands of the routine associated with an incoming instruction). Since, in the example operation first described herein, a previous instruction was completed prior to clock A of FIG. 2, the command register 55 is in the idle state when the incoming instruction arrives (The idle state of command register 55 will be discussed in greater detail below.)

Further, since the clock of the micro-machine/interface 9, and the clock of the CPU 10 are asynchronous from one another, the phase relationship between the clock of the CPU 10 and the clock of the micro-machine/interface 9 is not known. Therefore, the incoming instruction is not synchronized to the clock of the micro-machine/interface 9 until one to two clock cycles after arrival of an instruction control signal (shown on FIG. 2) that indicates the arrival of an incoming instruction. One clock cycle after synchronization of the incoming instruction, the command register 55 leaves its idle state and begins executing the incoming instructi n (i.e. begins clocking through the commands of the routine of the incoming instruction). Accordingly, since, in the example operation described herein, the incoming instruction arrives during clock cycle A-B, the command register 55 is in its idle state until clock D of FIG. 2.

As stated, in prior art asynchronous micro-machines synchronization of the incoming instruction, as well as transfer of control to the routine of the incoming instruction must occur before any actions for the instruction take place. In direct contrast, the invented micro-machine/interface 9 initiates actions for the incoming instruction before execution of the instruction begins (i.e. before the command register 55 begins clocking through the commands of the routine of the incoming instruction) and during transfer of control to the routine of the incoming instruction.

The above has been made possible through the novel implementation of the fact that many actions are common to the vast majority of instructions (i.e. the channeling of an operand to an arithmetic unit, the channeling of a register file address to a register file, etc.)

As will later be explained in greater detail, this is partly achieved by various control signals which are loaded into command register 55 upon the completion of every instruction and which collectively comprise a single command which is referred to herein as the "idle state command". As will also later be explained in more detail, the actions which take place prior to execution of the incoming instruction and during transfer of control to the routine of the incoming instruction is also achieved by a synchronization/synchronization assist circuit 60 which determines when these actions take place. The above mentioned control signals of which the idle state command is comprised are stored in a memory location, of a microstore 50, that is associated with the operation of the micro-machine/interface 9 when the command register 55 is in the idle state. Upon the completion of an instruction, all routines transfer control to that memory location and the idle state command stored therein. Since the command register 55 asserts the control signals of the idle state command while the same is in the idle state, it causes the performance of actions common to most incoming instructions prior to execution of the commands specified by the routine of the incoming instruction and during transfer of control to that routine, thereby greatly decreasing latency. These control signals are divided into five major groups and will be discussed below with reference to FIGS. 1 and 3. It is important to note that some of the control signals of the idle state command are also asserted by command register 55 when it is not in its idle state is (i.e. when it is executing the incoming instruction), the important difference being that the signals which are loaded in the command register 55 after the command register 55 leaves the idle state are a part of the routine that is associated with the incoming instruction, whereas the control signals asserted by the command register when it is in the idle state are not.

A first group of the control signals which the command register 55 asserts when in the idle state are termed herein as "idle signals", which the command register 55 transmits to a synchronization/synchronization assist circuit 60. These idle signals inform the synchronization/synchronization assist circuit 60 that the command register is in its idle state and are also channeled through synchronization/synchronization assist circuit 60 to instruction latches 20 and parameter latches 30 (as indicated in FIG. 1) and, upon assertion thereat, open instruction and parameter latches 20 and 30 such that they are in their open (i.e. flow through) mode when the command register 55 is in the idle state (in our example operation until clock D in FIG. 2). When the command register 55 leaves its idle state, (in the example operation described herein at clock D) the idle signals are deasserted. Deassertion by the command register 55 of the idle signals closes latches 20 and 30 such that the same capture the information that has been flowing therethrough, and thus, the information transmitted continues to be transmitted by their respective outputs until latches 20 and 30 are opened by reassertion of the idle signals upon completion of the execution of the incoming instruction.

A second group of the five groups of control signals that the command register 55 transmits when in the idle state are signals which multiplex incoming instruction information that is transmitted to data path elements 40 and are termed herein, as "data path multiplexing control signals". A predetermined set of these signals are asserted when the command register 55 is in the idle state.

Since, in the example operation described herein, instruction latches 20 are in their open (flow-through) mode upon the arrival of the incoming instruction (i.e. sometime between clock cycles A to B, as shown in FIG. 2 and hereinafter "arrival"), the operand of the incoming instruction flows through instruction latch 20 to data path elements 40 and the data path multiplexing signals issued by command register 55 while in the idle state channel the operand of the incoming instruction to arithmetic units 40B of data path elements 40, also upon arrival and before clock D.

Also upon arrival, the incoming instruction is asserted at the input of the instruction translation 15. Instruction translation 15, in the preferred embodiment, comprises a mapping RAM 15A and an instruction decode 15B.

The instruction decode 15B of instruction translation 15 receives the user register address specified in the incoming instruction and translates the user register address into the the register file address of the register files 40A (in our exemplary instruction register 1). The register file address is transmitted along parameter registers by-pass 26 to data path elements 40 and to parameter registers 35 by instruction decode 15B of instruction translation 15, in the example operation described herein, sometime after arrival and before clock D. The register file address transmitted along parameter registers by-pass 26 is channeled by corresponding data multiplexing control signals which are transmitted by command register 55 to data path elements 40 when the command register 55 is in the idle state, to the address inputs of the register files 40A of data path elements 40, sometime between arrival and clock D. The register file address channeled to the address inputs of the register files 40A begins the reading of the register addressed and thus initiates the outputting of the contents of that register (in our example, register 1 of the register files 40A).

With respect to parameter registers 35, loading of parameter registers 35 is controlled by load enable signals asserted by synchronization/synchronization assist circuit 60 to parameter registers 35 and these signals are not asserted until after the command register 55 leaves its idle state. Accordingly, in the example instruction herein described, the above mentioned register file address is not clocked into parameter registers 35, and as such, is not valid at the output of parameter registers 35, until after clock D.

Since in the example operation herein described the command register 55 deasserts the idle signals at clock D, and thus latches 20 and 30 are thereby closed at clock D, the operand which, prior to clock D, was flowing through instruction latches 20 is thereby captured by instruction latches 20 and remains valid at the output of the same until the previously mentioned idle signals are reasserted upon the completion of the routine of the incoming instruction. It will be appreciated that the operand which is captured by instruction latches 20 at clock D and which is valid at the output of instruction latches 20 may be used again throughout the routine when an error occurs.

The address field of the incoming instruction (which in our specific exemplary incoming instruction is comprised of the instruction op code and the user register address) is channeled to the address inputs of mapping RAM 15A, and causes the outputting, by mapping RAM 15A, of instruction control bits that designate what type of operation (i.e. addition, multiplication, etc.) and what type of operand (i.e. single precision, double precision etc.) are associated with the incoming instruction. These instruction control bits are outputted by mapping RAM 15A sometime after arrival and before clock D and are transmitted through parameter latches 30 to data path elements 40.

The instruction control bits that designate what type of operand is contained in the incoming instruction are channeled to the arithmetic units 40B by corresponding data multiplexing control signals which are transmitted by command register 55 to data path elements 40 while the command register 55 is in its idle state. As will later be discussed, the instruction control bits that designate what type of operation is requested by the incoming instruction are not utilized within data path elements 40 until after the command register 55 leaves its idle state.

In the example operation herein described, as stated, parameter latches 30 are closed at clock D so that the previously mentioned control bits which designate what type of operation is requested by the incoming instruction are thereby captured by the parameter latches 30 and are continuously asserted and at the output of the same until the command register 55 reasserts the idle signals.

The control bits which designate what type of operation is requested by the incoming instruction are channeled after clock D by the commands outputted by the command register 55 which are a part of the routine of the incoming instruction to arithmetic units 40B, thereby instructing the arithmetic unit 40B as to what type of operation it must perform. It is important to note that many instructions (for example, addition, subtraction) differ from one another only in the value of the control bits associated with each instruction that designate what type of operation is requested.

In prior art devices these control bits are stored in a microstore with a different set of commands for each routine. In the present invention, since these control bits are derived from the incoming instruction by the instruction decode 15B and are not stored in microstore memory 50, the same routines may be used for many different instructions, thereby minimizing the amount of microstore space required for storing commands.

In view of the above discussion, it will be appreciated that the aspect of the present invention wherein control bits that designate what type of operation is requested by the incoming instruction and what type of operand is contained therein may also be efficaciously used with micro-machines which are synchronous with the master CPU (i.e. where the clocks of the micro-machine and the CPU are in phase with one another) since the above described result effect, (i.e. minimizing that amount of microstore space required for storing commands) can be achieved in both synchronous and asynchronous micro-machines when this aspect of the present invention is employed.

The address field of the incoming instruction which, as stated, is channeled to the address lines of the mapping RAM 15A, also specifies a memory location within mapping RAM 15A that contains the routine starting address that is associated with the incoming instruction.

Sometime between arrival and clock D of FIG. 2, the mapping RAM 15A transmits the instruction routine starting address to the input 41 of next address generation 45. Since, as previously discussed, in the example operation herein described, command register 55 is in its idle state until clock D, predetermined values of a third group, of the previously discussed five groups of control signals, termed herein as "next address control signals" are asserted at the input 43 of next address generation 45 sometime prior to clock D. These next address control signals instruct the next address generation 45 to channel the instruction routine starting address, which was transmitted to input 41 of next address generation 45, through next address generation 45 to the address inputs of the microstore 50. After clock D, next address control signals, which are specified by the routine of the incoming instruction, are asserted at input 43 of next address generation 45 and instruct the next address generation 45 to ignore the routine starting address of the incoming instruction and also instruct the next address generation 45 how to generate the remaining microstore addresses associated with the routine of the incoming instruction (i.e. sequential addressing, jump, call, return etc.). The next address control signals asserted by command register 55 which are specified by the routine of the incoming instruction determine corresponding memory locations within microstore 50 wherein are stored the remaining commands of the routine of the incoming instruction.

The instruction routine starting address of the incoming instruction is asserted at the address inputs of microstore 50 sometime after arrival and before clock D and specifies a memory location within microstore 50 which contains the first command of the routine of the incoming instruction. Microstore 50, in turn asserts the first command at the input 51 of command register 55. As previously discussed, in the specific example described herein, command register 55 is in its idle state and is frozen until clock D. Accordingly, the first command of the incoming instruction, which in our example is asserted at the input of command register 55 sometime between arrival and clock D, is not clocked through command register 55 until after the command register 55 leaves its idle state at clock D. The clocking of command register 55 will later be discussed with reference to FIG. 3.

Figure 3:
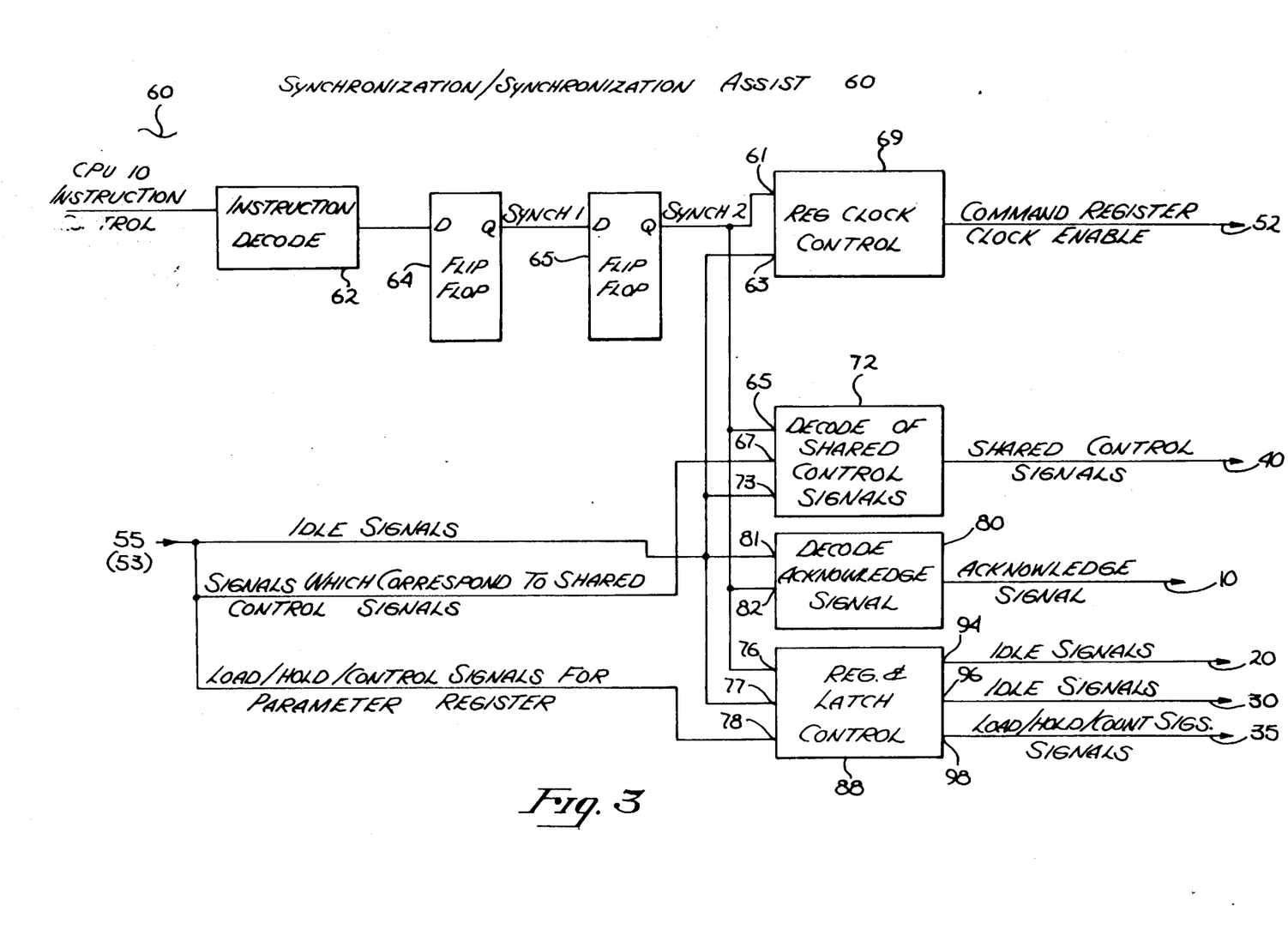
FIG. 3 shows an exploded block diagram view of the synchronization/synchronization assist component of FIG. 1.

Operation of synchronization/synchronization assist circuit 60 of FIG. 1 will now be discussed in detail with reference to FIG. 3 in addition to FIGS. 1 and 2. In FIG. 3 there is shown an exploded block diagram of the components of synchronization/synchronization assist circuit 60. Instruction control signals are trans. itted by CPU 10 to an instruction decode circuit 62 of . chronization/synchronization assist circuit 60 between, in the example operation herein described, clock cycles A-B of FIG. 2. These instruction control signals indicate the arrival of the incoming instruction which has been previously described with reference to FIG. 1.

The instruction decode circuit 62 determines whether or not a valid access is being requested by the CPU 10 and, if a valid access is being requested, asserts the input of flip flop 64. Flip flop 64 is clocked by the clock of the micro-machine/interface 9, and, accordingly, at clock B a synch 1 signal is asserted at output Q of flip flop 64 and input D of flip flop 66. The synch 1 signal is shown in FIG. 2. Flip flop 66 is also coupled to the clock of the micro-machine and, accordingly, at clock cycle C, the synch 2 signal is asserted at the output Q of flip flop 62. The synch 2 signal is shown on FIG. 2. The synch 2 signal outputted by flip flop 66 is, in turn, asserted at the input 61 of command register clock control circuit 69, the input 65 of decode of shared control signals circuit 72, input 82 of decode acknowledge signal circuit 80 and input 76 of register and latch control 88. Also, as shown in FIG. 3, input 63 of register clock control circuit 69, inputs 67 and 73 of decode of shared control signals circuit 72, input 81 of decode of acknowledge signal circuit 80 and, inputs 77 and 78 of register and latch control circuit 88 are coupled to the output 53 of the command register 55 of FIG. 1, in order to receive various control signals therefrom as discussed below. The decode of shared control signals circuit 72 is coupled to data path elements 40 and asserts shared control signals which initiate actions for the incoming instruction, within data path elements 40.

A fourth group of the control signals which the command register 55 asserts when in the idle state are termed herein as "signals which correspond to shared control signals" and are discussed below. (Note: these signals are also transmitted as a part of the routine of all instructions). Note also; as previously discussed, all of the control signals which are transmitted by the command register 55 when it is in its idle state are taken from a memory location of microstore 50 wherein is stored the idle state command and all of the control signals which the command register 55 asserts when it is not in its idle state are taken from memory locations of the microstore 50 wherein are stored the commands which comprise the routine.

A particular shared control signal is asserted by decode of shared control signals 72 whenever: (i) a control signal corresponding to a particular desired shared control signal is asserted at input 67 by the command register 55 and the idle signals (which are also transmitted by the command register 55) are deasserted at input 73 or; (ii) a signal corresponding to a particular desired shared control signal is asserted at input 67, idle signals are asserted to input 73 and the synch signal 2 is asserted to input 65. As stated, when the command register 55 is in the idle state it asserts predetermined signals which correspond to shared control signals. Thus, in the exemplary instruction previously described with reference to FIG. 1, sometime before clock D a first predetermined shared control signal (shown on FIG. 2) is asserted by decode of shared control signals circuit 72, to the arithmetic unit 40B of data path elements 40. This first predetermined shared control signal triggers the loading of the operand of the incoming instruction into the arithmetic unit 40B at clock D.

The command register clock control circuit 69 of FIG. 3 is coupled to the clock enable input 52 of the command register 55 of FIG. 1 and is also coupled to the clock of the micro-machine/interface 9. One clock cycle after the point in time at which both the synch 2 signal and the idle signals are asserted, respectively, at inputs 61 and 63, (i.e. in the example operation herein described at clock D) the command register clock control circuit 69 enables the clock of the command register 55, such that the same leaves its idle state and clocks through the first command specified by the routine starting address of the incoming instruction which had previously been asserted at input 51 of the command register 55, in the manner described with reference to FIG. 1.

Thereafter, during the remainder of the routine of the incoming instruction the clock of command register 55 continues to be enabled by the register clock control circuit 69 until the command register 55 indicates, to the register clock control circuit 69, the completion of the incoming instruction by reasserting the previously discussed idle signals at the input 63 thereof. After being enabled by command register clock control circuit 69, as described with reference to FIG. 1, the command register 55 continuously asserts next address control signals, which are specified by the routine, at input 43 of the next address generation circuit 45 of FIG. 1, such that the next address generation circuit 45 continuously sequences through memory locations of microstore 50 such that microstore 50 continuously outputs the remaining commands of the routine to the input 51 of command register 55.

The decode acknowledge circuit 80 issues an acknowledge signal to the CPU 10 at the next rising transition of a clock after command register idle signals are asserted at input 81 thereof and the synch 2 signal is asserted at input 82 of the same. Note: because the incoming instruction is captured in the instruction latches 25, parameter latches 30 and parameter registers 35 of FIG. 1, when the command register 55 leaves the idle state, as previously discussed with reference to FIG. 1, transmission of the incoming instruction by the CPU is no longer required after clock D.

With reference to the register and latch control circuit 88 of FIG. 3, output 94 thereof is coupled to the enable inputs of instruction latches 20, output 96 is coupled to the enable inputs of the parameter latches 30 and output 98 is coupled to the load/count/hold control inputs of parameter registers 35.

The register and latch control circuit 88 channels, via outputs 94 and 96, the idle signals which open, respectively, instruction latches 20 and parameter latches 30 whenever command register idle signals are asserted at input 77. As stated with reference to FIG. 1, when these idle signals are deasserted by command register 35 at input 77, the instruction latches 20 and parameter latches 30 become closed.

A fifth group of the control signals which the command register 55 transmits when in the idle state are termed herein as "parameter registers control signals". The parameter registers control signals are transmitted by command register 55 to the register and latch control circuit 88 at input 78. These parameter registers control signals play a role in the outputting of load/hold/count signals outputted by register latch control circuit 88 in the following way: 1) If the idle signals are asserted at input 77 and the synch 2 signal is asserted, at input 76 the registers will be loaded at the next transition of the clock of the micro-machine/interface. 2) During instruction execution (i.e. idle signals are not asserted at input 77) the synch 2 signal is ignored and the parameter registers control signals asserted by command register 55 at input 78 are routed directly to the parameter registers 35.

As stated, for purposes of illustration, operation of the micro-machine/interface 9 of FIG. 1 in its execution of an exemplary instruction (the addition of the operand to the contents of register 1) has been described. However, as mentioned, the micro-machine/interface 9 may execute a full range of more complicated instructions such as, for example, vector addition, vector subtraction, etc. In a situation wherein a vector addition is requested by the incoming instruction, the counting of the parameter registers 35 will be enabled during several clock cycles over the course of the execution of the instruction in the manner previously discussed with reference to FIG. 3, thereby incrementing or decrementing the register file address stored in the parameter registers 35. It will also be appreciated that additional registers may be employed with the invented micro-machine/interface 9, in a similar manner as are parameter registers 35, to perform register operations upon direct untranslated portions of an incoming instruction.

In the example operation herein described, after the command register 55 leaves its idle state it asserts data multiplexing signals to data path elements 40 which channel the contents of the information read from register 1 of register files 40A to the arithmetic unit 40B of FIG. 1. Also, the command register 55 transmits a signal which corresponds to a second shared control signal to synchronization/synchronization assist circuit 60 which, in turn, asserts a second shared control signal to data path elements 40 that intitiates the loading of the contents of Register 1 of the register files 40B into the arithmetic units 40A and which also intitiates the adding therein of the operand (which had been previously loaded into the arithmetic unit 40B by the first shared control signal) and the information that has been read from register 1.

The add operation initiated by the assertion of the second shared control signal continues until sometime between clock cycles E to n of FIG. 2. Accordingly, sometime after clock E, the addition is completed and command register 55 transmits further commands specified by the routine which channel the output of the arithmetic unit to the register files 40A, verifies that no errors were made during the addition of the operand and the contents of register 1, channels the register file address (which, as discussed is valid between clock cycles D to n at the output of parameter registers 35) to the address inputs of the register files 40B and writes the results of the addition operation into register 1 thereof.

The above-discussed example operation of the micro-machine/interface 9 occured in a situation wherein an incoming instruction arrived sometime between clock cycles A-B and a previous instruction was not being executed by the micro machine/interface 9 during clock cycle A-B, such that, command register 55 was in its idle state when the incoming instruction arrived.

In a situation wherein the micro-machine/interface 9 is completing a previous instruction upon arrival of a new incoming instruction and, for example, the command register 55 completes the previous instruction at clock n, the command register 55 will enter the idle state at clock n and begin execution of the new instruction one clock cycle later. Note, that because in this situtation the command register 55 is in its idle state at clock n, the previously described actions, which are triggered by the five groups of control signals that the command register 55 transmits when in idle, take place. Also, because the synchronization/synchronization assist circuit 60 recognizes that the new incoming instruction has arrived, the command register is not required to execute commands which have been fetched from microstore space in order to determine if a new instruction has arrived (as previously discussed with reference to FIGS. 1, 2 and 3), as are all command registers of prior art asynchronous micro-machines. As such, it will be appreciated that even in situations wherein a previous instruction is being executed when a new incoming instruction arrives, latency is greatly reduced.

Also, as indicated with reference to FIG. 1, while a previous instruction is executing the routine starting address of the new incoming instruction outputted by mapping RAM 15A of instruction translation 15 to next address generation 45 (of FIG. 1) will not be channeled to microstore 50 until the command register 55 enters its idle state and asserts appropriate next address control signals at input 43 of next address generation 45 to sequence the routine starting address through next address generation 45 to microstore 50 as previously described.

The micro-machine/interface 9 of FIGS. 1 and 3 is designed to execute single access instructions (i.e. when the instruction address field is not larger than the address bus of the master CPU and the data field of the incoming instruction is not larger than the data bus of the master CPU). It will be appreciated that instructions in which the instruction address field is larger than the address bus of the master CPU or in which the data field is larger than the data bus of the master CPU must be transmitted to the micro-machine/interface 9 in two accesses.

Figure 4:
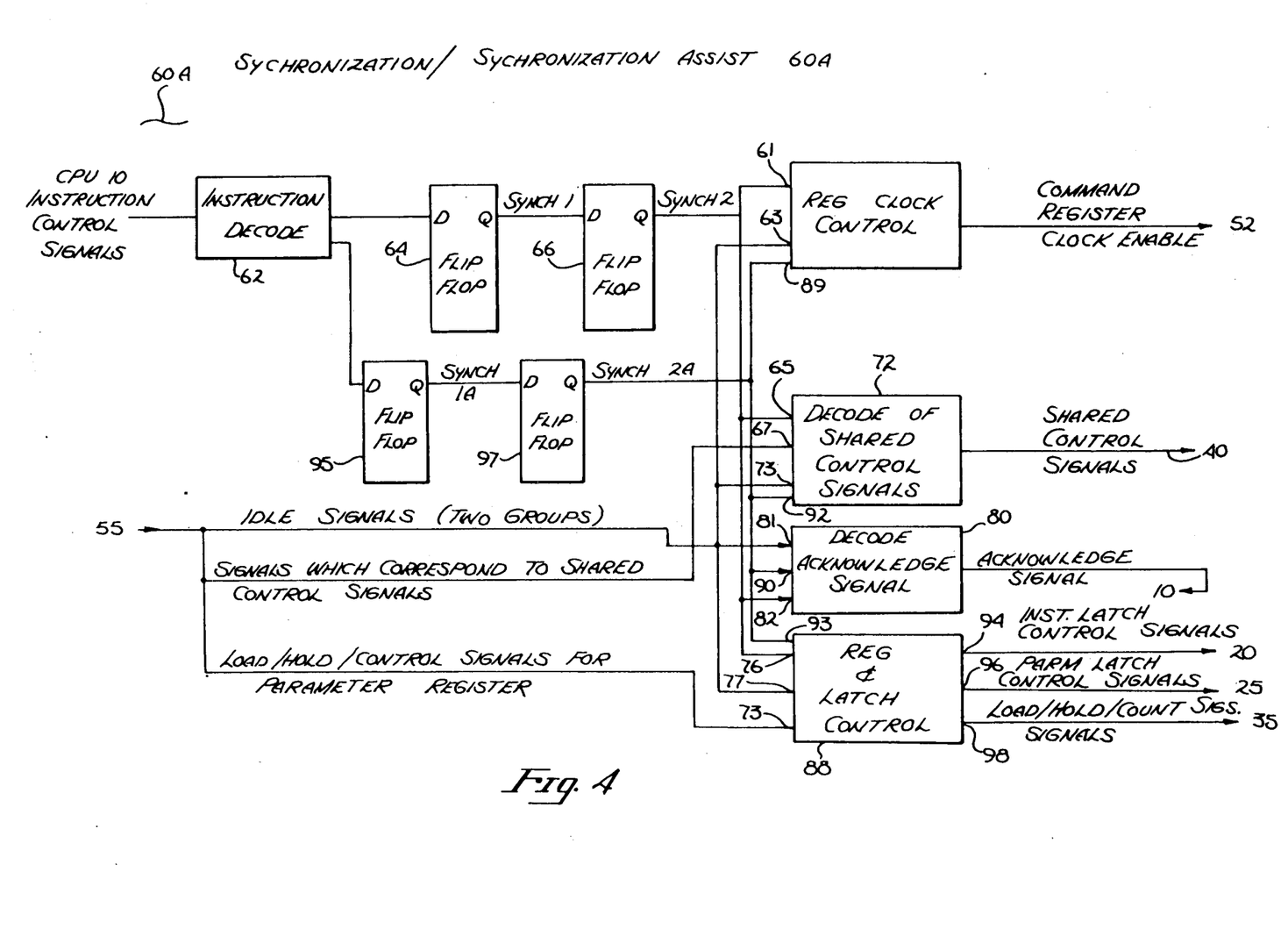
FIG. 4 shows an exploded block diagram view of a synchronization/synchronization assist component of a second embodiment of the invented micro-machine/interface.

In FIG. 4 there is shown an exploded block diagram veiw of a synchronization/synchronization assist circuit 60A, which, when used in place of synchronization/synchronization assist circuit 60 of FIGS. 1 and 3, provides a second embodiment of the micro-machine/interface 9 for executing two access instructions.

It will be observed that the synchronization/synchronization assist circuit 60A for two access instructions of FIG. 4 differs from the synchronization/synchronization assist circuit 60 of FIG. 3 in that the former has two additional flip flops 95 and 97. As with flip flops 64 and 66, flip flops 95 and 97 are coupled to the output of instruction decode circuit 62, command register clock control circuit 69 at input 89 thereof, decode of shared control signals circuit 72, decode acknowledge signal circuit 80 and register and latch control circuit 88.

In a two access instruction, first and second instruction control signals are asserted respectively, by the CPU 10 at instruction decode circuit 62. A first instruction control signal is asserted when the first half of a two access instruction is transmitted to the micro-machine/interface 9 and a second instruction control signal is transmitted when the second half of a two access instruction is transmitted by CPU 10.

Assuming that command register 55 is in a first idle state upon the assertion of the first instruction control signal indicating the arrival of the first access of the two access instruction, the actions previously described with reference to FIGS. 1, 2 and 3 take place excepting that upon completion of the portion of the routine associated with the first access of a two access instruction the command register 55 enters into a second idle state and transmit a command that is associated with that second idle state. Synchronization/synchronization assist 60A will then disable the clock of the command register 55 until the second access of the two access instruction is synchronized, as discussed below. Unlike the first idle state, in a two access instruction, the command outputted by the command register 55 when in its second idle state is a part of the routine of the two access instruction. The second idle state and its associated idle state will also later be discussed.

After the first access of the two access instruction has been accepted and the CPU has received a first acknowledge signal outputted by decode acknowledge signal circuit 80 in the manner previously described with reference to FIG. 3, the CPU will transmit the second access and its associated second instruction control signal.

The second instruction control signal will be asserted at instruction decode circuit 62 and the same will, in turn, assert the input D of flip flop 95 such that, one clock cycle later, a synch 1A signal is asserted at output Q of flip flop 95 and input D of flip flop 97. One clock cycle after assertion of the synch 1A signal, a synch 2A signal is asserted at the output Q of flip flop 97 and thus at the input 89 of command register clock control circuit 69, the input 92 of decode of shared control signals circuit 72, the input 90 of decode acknowledge signals circuit 80 and the input 93 of latch and enable control circuit 88. The synch 2A signal plays the same role in execution of the second half of the two access instruction as did the synch 2 signal in execution of the first half of the incoming two access instruction. Accordingly, one clock cycle after the assertion of synch 2A and the assertion of the idle signals, the clock command register 55 is enabled, the same leaves the second idle state and a second acknowledge signal is sent to CPU 10.

Note, in the second embodiment, since the routine starting address is not asserted during the second access, it is not employed in the second access.

In the two access instruction embodiment of FIG. 4, there are two groups of idle signals transmitted by command register 55 during, respectively, the first and second idle states. Assertion and deassertion of the first group of idle signals triggers the outputting by latch and register control circuit 88 of instruction latches enable signals and parameter latches enable signals at, respectively, outputs 94 and 96 which, respectively, open and close a first plurality of latches of instruction latches 20 and parameter latches 25 in the manner previously discussed with reference to FIGS. 1 and 3. The first plurality of latches of instruction and parameter latches 20 and 25 capture portions of the first access of the two access incoming instruction.

A second plurality of latches of instruction and parameter latches 20 and 25 transmit and capture portions of the second access of the two access incoming instruction. Instruction latch enable signals and parameter latches enable signals are asserted by register and latch control circuit 88 to the second plurality of latches such that the second plurality of latches are open from the assertion of the first group of idle signals and after deassertion of the same until the deassertion of the second group of idle signals.

Similarly, with reference to the parameter registers 35 of FIG. 4, a first plurality of parameter registers of parameter registers ' ' capture and transmit portions of the first access of the two access incoming instruction. The first plurality of parameter registers are triggered to load the portions of the first access of the two access instruction, when the command register leaves the first idle state, by load signals outputted by register and latch control circuit 88 of FIG. 3 at output 98 thereof. A second plurality of registers of parameter registers 35 capture and transmit portions of the second access of the incoming two access instruction when the command register leaves the second idle state thereby triggering register and latch control circuit 88 to output appropriate load signals to the second plurality of registers.

After completion of the first access of the two access instruction, when the command register 55 enters into the second idle state, control signals are asserted by the same which, in conjunction with synchronization/synchronization assist circuit 60A perform actions associated with the second access prior to the execution of the same. These second idle state actions are initiated in the same manner as are the idle state actions which have been previously discussed with reference to FIGS. 1–3.

Further, in the second embodiment of the micro-machine/interface 9, the command register 55 does not have to execute any instructions to determine if the second access has arrived and so that execution of the first half of the two access instruction will begin prior to the arrival of the second access of the two access instruction.

Figure 5:
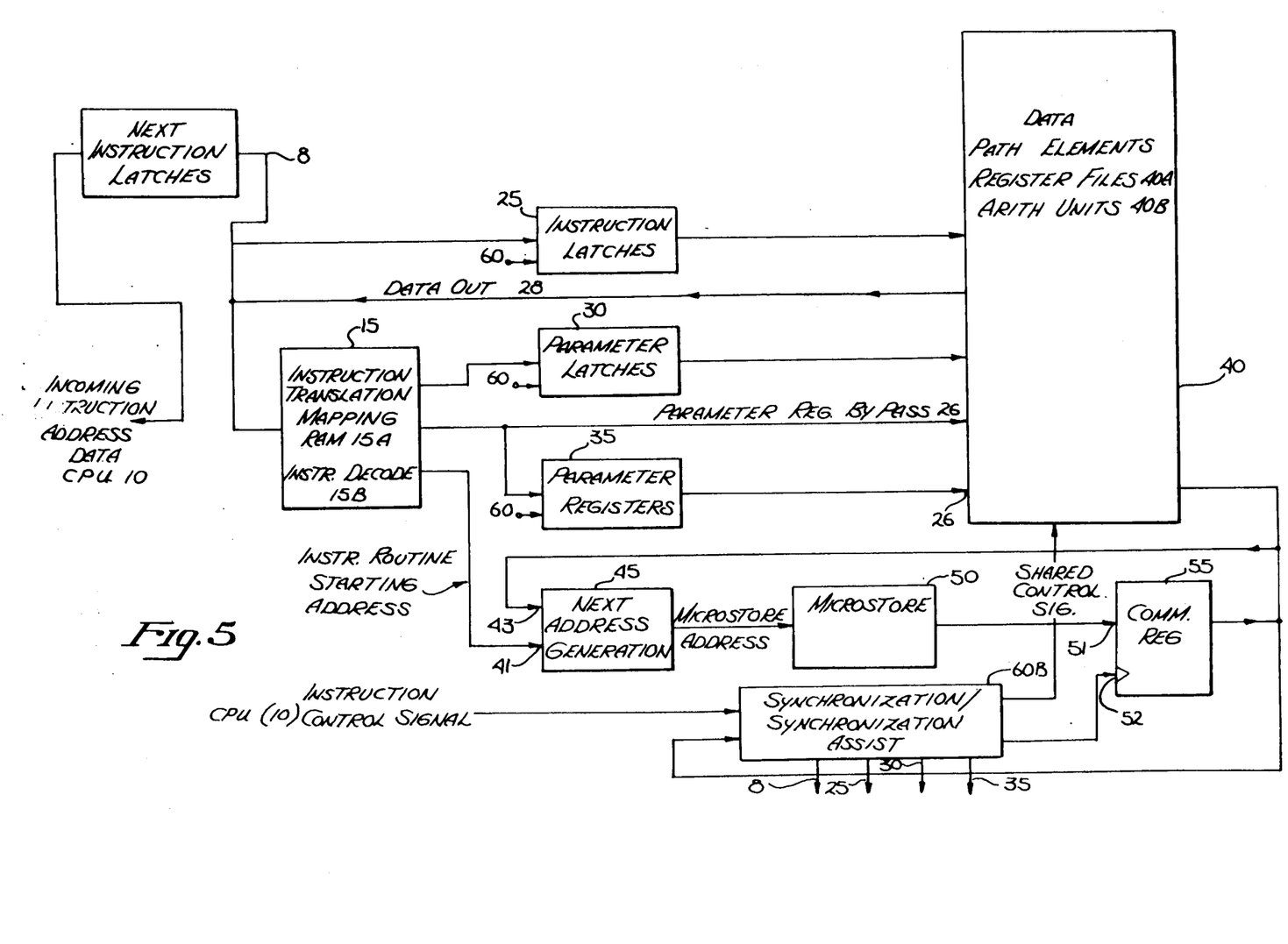
FIG. 5 shows a block diagram view of a third embodiment of the invented micro-machine/interface.

In FIG. 5 there is shown a third embodiment of the invented micro-machine/interface 9 having an incoming instruction pipeline so that the micro-machine/interface 9 may hold and begin to translate and synchronize an incoming instruction while a previous instruction is being executed. It will be observed that the third embodiment of the "pipeline" micro-machine/interface 9 of FIG. 5 differs from the first embodiment of the micro-machine/interface of FIG. 1 in that the former employs next instruction latches 8 and a different synchronization/synchronization assist circuit 60B.

For purposes of illustration of the operation of the third embodiment of the micro-machine/interface 9 of FIG. 5, operation of the micro-machine/interface 9 will be described in a situation wherein the micro-machine/interface 9 is not executing a previous instruction when an incoming instruction arrives. Under such a condition, next instruction latches 8, instruction latches 20 and parameter latches 30 will be in their open flow through mode. Accordingly, upon transmission of an incoming instruction by CPU 10, next instruction latches 8 will channel through the incoming instruction to the remainder of the micro-machine/interface 9 and the same will begin to perform the actions for the incoming instruction in the manner previously described with reference to FIG. 1. However, shortly after arrival of the incoming instruction, synchronization/synchronization assist circuit 60B deasserts the enables of next instruction latches 8 thereby closing next instruction latches 8 such that the incoming instruction is captured in next instruction latches 8 shortly after arrival of the incoming instruction. Synchronization/synchronization assist circuit 60B then sends an acknowledge signal to the CPU 10 such that the incoming instruction is no longer transmitted by the CPU 10 and the same is then free to transmit another incoming instruction. Thereafter, the actions previously described with reference to FIG. 1 take place, and instruction latches 20 and parameter latches 30 are closed as previously described. After the closing of instruction and parameter latches 20 and 30, the synchronization/synchronization assist circuit 60B reasserts the enables of the next instruction latches 8 thereby opening the next instruction latches 8 such that the same may receive and, in turn, capture a new second incoming instruction.

Accordingly, shortly after arrival of a second incoming instruction, next instruction latches 8 are again closed such that the second incoming instruction is captured in next instruction latches 8 and the CPU 10 receives another acknowledge signal transmitted by synchronization/synchronization assist circuit 60B. Since the next instruction latches 8 have been closed to capture the incoming instruction, the same is valid at the output of the next instruction latches 8 and available for use by the micro-machine/interface 9 as previously described with reference to FIG. 1.

Figure 6:
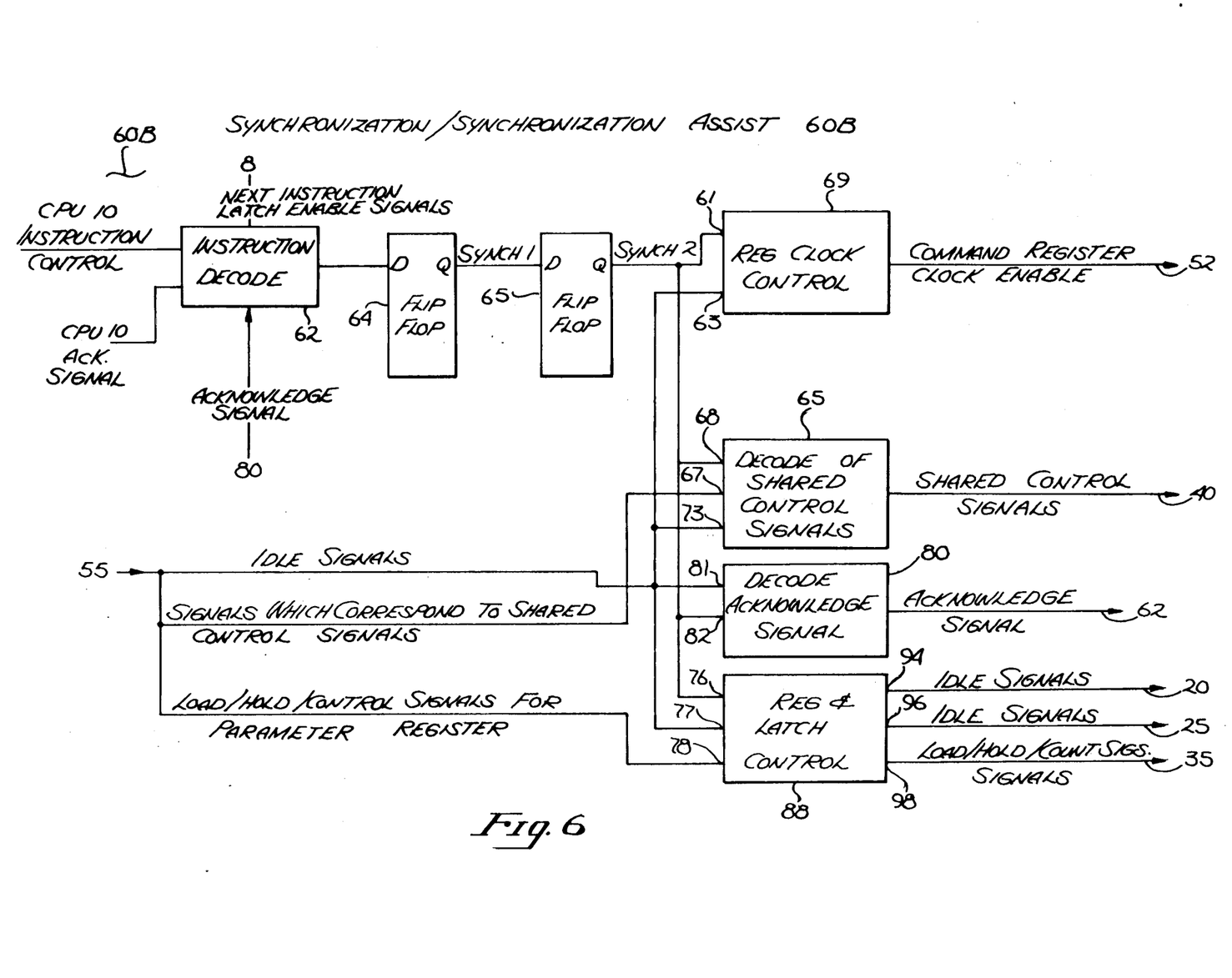
FIG. 6 shows an exploded block diagram view of the synchronization/synchronization assist component of the micro-machine/interface of FIG. 5.

In FIG. 6 there is shown an exploded block diagram of synchronization/synchronization assist circuit 60B for the pipeline micro-machine/interface of FIG. 5.

As illustrated in FIG. 6, instruction decode circuit 62 receives the acknowledge signal outputted by decode acknowledge signal circuit 80. When an incoming instruction is indicated by an instruction control signal at the input of instruction decode circuit 62, instruction decode circuit 62 deasserts the enables of next instruction latches 8 thereby closing the same and capturing the incoming instruction flowing through the next instruction latches 8. After the next instruction latches are closed, the decode acknowledge signal 82 sends an acknowledge signal to the CPU 10. [Note, because the instruction is captured in next instruction latches 8 (as opposed to registers), latency is not increased by the addition of the pipeline comprised of the next instruction latches 8 of FIG. 5.] After receipt of the acknowledge signal outputted by decode acknowledge signal circuit 80, instruction decode circuit 62 then asserts the enables of next instruction latches 8 thereby opening next instruction latches 8 and releasing the instruction stored therein for execution of the instruction in the manner previously described with reference to FIG. 1. At this point in time, the next instruction latches 8 are ready for receipt and capture of a second incoming instruction in the manner previously described with reference to FIG. 5.

It will be appreciated that the present invention may also be employed in a situation wherein the clock which runs the micro-machine is in phase with the clock which runs the CPU. In such a situation, the present invention would yield a superior function over the prior art in that the above described performance of actions (i.e. the routing of data, etc.) would be performed prior to the transfer of control to the routine of the incoming instruction. It will be appreciated by those skilled in the art that in the situation wherein the micro-machine and the CPU operate in synchronicity with one another, the parameter and instruction latches in FIG. 1 would be replaced with registers since latch operation would not be required in a synchronous situation.

It will be appreciated by those skilled in the art that the embodiments of FIGS. 4, 5 and 6 may be combined as a single micro-machine/interface in order to perform all of the functions previously described with reference to the two embodiments.

It will also be appreciated that the above-described invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description, and all changes which come within the meaning and range of equivalency are, therefore, intended to be embraced therein.

What is claimed is:

1. An asynchronous micro-machine/interface responsive to a single incoming instruction transmitted from a host central processing unit (CPU) by decoding the instruction and executing a routine representative of the incoming instruction, said CPU and said micro-machine/interface being clocked on clocks from different clock sources which are asynchronous to one another, whereby it is required that the incoming instruction be synchronized to the micro-machine/interface prior to decoding the incoming instruction and executing the routine representative to the incoming instruction, said asynchronous micro-machine/interface comprising:

data path element means for receiving a single incoming instruction from said CPU and for performing actions associated with said instruction during the synchronization of the incoming instruction to the micro-machine/interface and decoding of the instruction, said actions comprising channeling of data associated with the incoming instruction to an arithmetic processor of the micro-machine/interface;

wherein the performance of said actions within said data path element means occurs during the synchronization of the incoming instruction to the micro-machine/interface and the decoding of the instruction such that said actions are performed prior to execution of the routine representative of the instruction;

instruction decoding means connected to the data path element means for decoding the incoming instruction to determine the routine representative of the instruction;

microstore means responsive to said CPU for storing and outputting an idle state command and a plurality of commands, said plurality of commands being a part of the routine corresponding to said incoming instruction;

command register means for receiving and outputting said idle state command, said command register means having an active and an idle state, said active state being defined as a first time period in which said command register means executes the incoming instruction by outputting said plurality of commands, said idle state being defined as the period in which said command register means does not execute the incoming instruction; said command register means being coupled to said microstore means and said data path element means, said command register means entering said idle state and outputting said idle state command upon the completion of the execution of said incoming instruction, said command register receiving said idle state command upon the completion of the execution of said incoming instruction such that upon completion of an instruction previous to said incoming instruction, said command register means transmits said idle state command to said data path element means prior to execution of said incoming instruction;

instruction translation means for translating said incoming instruction and outputting a translated instruction having a routine starting address of the routine of the incoming instruction, said instruction translation means communicating with said microstore means and transmitting to said microstore means the routine starting address of said incoming instruction such that said microstore means outputs to said command register means a first command of said plurality of commands;

wherein when said command register means is in said idle state and after synchronization of said incoming instruction, said synchronization means enables said command register means such that said command register means outputs said first command to said data path elements, and thereafter, outputs the remaining commands specified by said routine to said data path element means;

synchronization assist means for assisting synchronization and execution of said incoming instruction, said synchronization assist means being coupled to said data path element and the output of said command register means, said command register means outputting to said synchronization assist means said idle state command such that in response to said idle state command, said synchronization assist means outputs a first shared control signal and in repsonse to said plurality of commands said synchronization assist means outputs a second shared control signal to said data path element means;

wherein said first shared control signals performs a predetermined number of said actions within said data path element means and said second shared control signal executes a predetermined portion of said incoming instruction;

a next address generation means for receiving said routine starting address outputted by said instruction translation means, said next address generation means being coupled to said microstore means and channeling said routine starting address to said next address generation means;

first latch means for transmitting and receiving a first predetermined portion of said incoming instruction, said first latch means being coupled to said CPU, said data path element means and said synchronization assist means, said synchronization assist means transmitting latch enable signals to said first latch means such that said first latch means is open when said command register means is in said idle state and closed to receive said first predetermined portion of said incoming instruction when said command register means is in said active state;

second latch means for transmitting and receiving a second predetermined portion of said translated instruction, said second latch means being coupled to said instruction translation means, said data path element meand and said synchronization assist means, said synchronization assist means outputting latch enable signals to said second latch means such that, said second latch mean is open when said command register means is in said idle state and closed to receive said second predetermined portion of said incoming instruction when said command register means is in said active state;

register means coupled to said instruction translation means and said data path element means for receiving and transmitting a third predetermined portion of said incoming instruction, said synchronization assist means transmitting register control signals to said register means such that, when said registcontrol signals are asserted, said register means receives said third predetermined portion of said translated instruction; and register by-pass means coupled between said instruction translation means and said data path element means for transmitting said third predetermined portion of said instruction.

2. An asynchronous micro-machine/interface responsive to a single incoming instruction transmitted from a host central processing unit (CPU) by decoding the instruction and executing a routine representative of the incoming instruction, said CPU and said micro-machine/interface being clocked on clocks from different clock sources which are asynchronous to one another, whereby it is required that the incoming instruction be synchronized to the micro-machine/interface prior to decoding the incoming instruction and executing the routine representative to the incoming instruction, said asynchronous micro-machine/interface comprising;

data path element means for receiving a single incoming instruction from said CPU and for performing actions associated with said instruction during the synchronization of the incoming instruction to the micro-machine/interface and decoding of the instruction, said actions comprising channeling of data associated with the incoming instruction to an arithmetic processor of the micro-machine/interface;

wherein the performance of said actions within said data path element means occurs during the synchronization of the incoming instruction to the micro-machine/interface and the decoding of the instruction such that said actions are performed prior to execution of the routine representative of the instruction;

instruction decoding means connected to the data path element means for decoding the incoming instruction to determine the routine representative of the instruction;

microstore means responsive to said CPU for storing and outputting an idle state command and a plurality of commands, said plurality of commands being a part of the routine corresponding to said incoming instruction;

command register means for receiving and outputting said idle state command said command register means having an active and an idle state, said active state being defined as a first time period in which said command register means executes the incoming instruction by outputting said plurality of commands, said idle state being defined as the period in which said command register means does not execute the incoming instruction; said command register means being coupled to said microstore means and said data path element means, said command register means entering said idle state and outputting said idle state command upon the completion of the execution of said incoming instruction, said command register receiving said idle state command upon the completion of the execution of said incoming instruction such that upon completion of an instruction previous to said incoming instruction, said command register means transmits said idle state command to said data path element means prior to execution of said incoming instruction;

instruction translation means for translating said incoming instruction and outputting a translated instruction having a routine starting address of the routine of the incoming instruction, said instruction translation means communicating with said data path element means and outputs control bits which, when received by said data path element means convey information to said data path element means pertaining to said incoming instruction, said instruction translation means communicating with said microstore means and transmitting to said microstore means the routine starting address of said incoming instruction such that said microstore means outputs to said command register means a first command of said plurality of commands;

wherein when said command register means is in said idle state and after synchronization of said incoming instruction, said synchronization means enables said command register means such that said command register means outputs said first command to said data path elements, and thereafter, outputs the remaining commands specified by said routine to said data path element means;

synchronization assist means for assisting synchronization and execution of said incoming instruction, said synchronization assist means being coupled to said data path element means and the output of said command register means, said command register means outputting to said synchronization assist means said idle state command such that in response to said idle state command, said synchronization assist means outputs a first shared control signal and in response to said plurality of commands said synchronization assist means outputs a second shared control signal to said data path element means;

wherein said first shared control signals performs a predetermined number of said actions within said data path element means and said second shared control signal executes a predetermined portion of said incoming instruction, said first and second control signals further increment and decrement said third predetermined portion of said incoming instruction.

3. The micro-machine/interface according to claim 2 wherein said synchronization means comprises:

flip/flop means, said flip/flop means being coupled to the clock of said micro-machine/interface such that, at least one micro-machine/interface clock cycle after said flip/flop means has received said instruction control signal, a synchronization occurs within said synchronization assist means, such that when said command register means is in said idle state and said synchronization occurs, said synchronization means outputs command register enable signals such that, said command register thereby enters into said active state.

4. An asynchronous micro-machine/interface responsive to a single incoming instruction transmitted from a host central processing unit (CPU) by decoding the incoming instruction and executing a routine representative of the incoming instruction, said CPU and said micro-machine/interface being clocked on clocks from different clock sources which are asynchronous to one another, whereby it is required that the incoming instruction be synchronized to the micro-machine/interface prior to decoding the incoming instruction and executing the routine representative of the incoming instruction said asynchronous micro-machine/interface comprising:

instruction translation means coupled to said CPU for receiving and translating a single incoming instruction and outputting a translated instruction;

command register means having an active and idle state, said active state being defined as the time period in which said command register means outputs commands which are a part of the routine representative of the incoming instruction said idle state being defined as the time period in which said command register does not output commands which are a part of said routine;

microstore means for storing a plurality of commands of said routine and for storing an idle state command, said idle state command being associated with the operation of the micro-machine/interface when said command register is in said idle state;

synchronization/synchronization assist means for synchronizing said incoming instruction to the clock of said micro-machine/interface, and for issuing a plurality of shared control signals, said synchronization/synchronization assist means being coupled to said CPU and the output of said command register means;

first latch means coupled to said CPU for transmitting and capturing a first predetermined portion of said incoming instruction in response to latch control signals issued by said synchronization/synchronization assist means;

second latch means coupled to said instruction translation means for transmitting and capturing a second predetermined portion of said translated instruction in response to said latch control signals issued by said synchronization/synchronization assist means;

register means coupled to said instruction translation means for transmitting and capturing a third predetermined portion of said translated instruction in response to register control signals issued by said synchronization/synchronization assist means;

register by-pass means coupled to said instruction translation means for transmitting said third predetermined portion of said incoming instruction;

next address generation means for determining memory locations of said microstore means wherein said idle state command and said plurality of commands of the routine are stored;

data path element means for performing actions that are associated with and are specified by said incoming instruction, said data path elements being coupled to said CPU, said command register means, said register by-pass means, said synchronization/synchronization assist means, said instruction translation means, said first and second latch means, said register means and said register by-pass means, such that said data path element means receives said third predetermined portion of said incoming instruction transmitted by said instruction translation means, said actions comprising channeling of data associated with the incoming instruction to an arithmetic processor of the micro-machine/interface;

said command register means issuing said idle state command to said synchronization/synchronization assist means, said data path element means, and said next address generation means, said idle state command instructing said next address generation means to channel said translated instruction to said microstore means thereby initiating the outputting of the first command of said plurality of commands by the command register means, initiating actions within said data path element means and instructing said synchronization/synchronization assist means to issue predetermined values of said shared control signal to said data path element means thereby initiating further actions within the data path element means;

wherein, when said command register means is in idle state and said incoming instruction is synchronized, said synchronization/synchronization assist means closes said first and second latch means, thereby capturing said first and second predetermined portions of said incoming instruction, enables said register means thereby storing said third predetermined portion of said incoming instruction and issues a command register enabling signal to said command register means, thereby clocking through said plurality of commands outputted by said microstore means.

5. An asynchronous micro-machine/interface responsive to a single incoming instruction transmitted from a host central processing unit (CPU) by decoding the incoming instruction and executing a routine representative of the incoming instruction, said CPU and said micro-machine/interface being run on clocks from different clock sources which are asynchronous to one another, whereby it is required that the incoming instruction be synchronized to the micro-machine/interface prior to decoding the incoming instruction and execution of the routine representative of the incoming instruction, said asynchronous micro-machine/interface comprising:

instruction translation means coupled to said CPU for receiving and translating an incoming instruction and outputting a translated instruction;

command register means having an active and idle state, said active state being defined as the time period in which said command register outputs commands specified by the routine of the incoming instruction, said idle state being defined as the time period in which said command register does not output commands which are part of said routine;

microstore means for storing commands for said routine and for storing an idle state command, said idle state command being associated with operation of the micro-machine/interface when said command register is in said idle state;

synchronization/synchronization assist means for synchronizing said incoming instruction to the clock of said micro-machine/interface, and for issuing a plurality of shared control signals, said synchronization/synchronization assist means being coupled to said CPU and the output of said command register means;

first latch means coupled to said CPU for transmitting and capturing a first predetermined portion of said incoming instruction in response to latch control signals issued by said syncronization/synchronization assist means;

second latch means coupled to said instruction translation means for transmitting and capturing a second predetermined portion of said translated instruction in response to said latch control signals issued by said synchronization/synchronization means;

first register means coupled to said instruction translation means for transmitting and capturing a third predetermined portion of said translation instruction in response to first register control signals issued by said synchronization/synchronization assist means;

first register by-pass means coupled to said instruction translation means for transmitting said third predetermined portion of said translated instruction;

second register means coupled to CPU for transmitting and capturing a fourth predetermined portion of said incoming instruction in response to second register control signals issued by said synchronization/synchronization assist means;

second register by-pass means coupled to said CPU for transmitting said fourth predetermined portion of said incoming instruction in response to second register control signals issued by said synchronization/synchronization assist means;

next address generation means for determining memory locations of said microstore means wherein are stored said idle state command and said plurality of commands;

data path element means for performing actions that are associated with and are specified by said incoming instruction, said data path elements being coupled to said CPU, said command register means, said synchronization/synchronization assist means, said instruction translation means, said first and second latch means, said first and second register means and said first and second register by-pass means, said actions comprising channeling of data associated with the incoming instruction to an arithmetic processor of the micro-machine/interface;

said command register means issuing said idle state command to said synchronization/synchronization assist means, said data path element means, and said next address generation means, said idle state command instructing said next address generation means to channel said translated instruction to said microstore means thereby initiating the outputting of the first commands of said plurality of commands by same, initiating actions within said data path element means and instructing said synchronization/synchronization assist means to issue predetermined values of said shared control signals to said data path elements thereby initiating further actions within same;

wherein, when said command register means is in idle state, and said incoming instruction is synchronized, said synchronization/synchronization assist means closes said first and said second latch means, thereby capturing said first and second predetermined portions of said incoming instruction, enables said first and second register means thereby storing said third and fourth predetermined portions and issues a command register enabling signal to said command register means, thereby clocking through said plurality of commands outputted by said microstore means.

* * * * *

UNITED STATES PATENT AND TRADEMARK OFFICE
CERTIFICATE OF CORRECTION

PATENT NO. : 5,053,941
DATED : October 1, 1991
INVENTOR(S) : Carrie

It is certified that error appears in the above-indentified patent and that said Letters Patent is hereby corrected as shown below:

In column 16, claim 1 at line 19, please delete " element " and insert
-- element means --.

Signed and Sealed this

Eighth Day of July, 1997

Attest:

BRUCE LEHMAN

*Attesting Officer*    *Commissioner of Patents and Trademarks*